(12) United States Patent
Mussel

(10) Patent No.: US 7,052,218 B2
(45) Date of Patent: May 30, 2006

(54) METHODS AND APPARATUS FOR ADJUSTING A PLUNGE ROUTER

(76) Inventor: Christopher John Mussel, 1 Fairway La., Seymour, CT (US) 06483

( * ) Notice: Subject to any disclaimer, the term of this patent is extended or adjusted under 35 U.S.C. 154(b) by 230 days.

(21) Appl. No.: 10/765,328

(22) Filed: Jan. 28, 2004

(65) Prior Publication Data
US 2005/0163580 A1 Jul. 28, 2005

(51) Int. Cl.
*B23C 1/20* (2006.01)
*B23C 1/00* (2006.01)

(52) U.S. Cl. ............... 409/182; 409/131; 409/218; 144/136.95

(58) Field of Classification Search .......... 409/131, 409/182, 181, 210, 185, 218; 144/136.95, 144/154.5; 188/24.12
See application file for complete search history.

(56) References Cited

U.S. PATENT DOCUMENTS

| | | | |
|---|---|---|---|
| 4,770,573 A | | 9/1988 | Monobe |
| 5,139,061 A | | 8/1992 | Neilson |
| 5,590,989 A | * | 1/1997 | Mulvihill ............ 409/182 |
| 5,725,036 A | | 3/1998 | Walter |
| 5,918,652 A | | 7/1999 | Tucker |
| 5,941,663 A | * | 8/1999 | Elrod et al. ........... 409/185 |
| 6,182,723 B1 | * | 2/2001 | Bosten et al. .......... 409/182 |
| 6,318,936 B1 | | 11/2001 | McFarlin, Jr. |
| 6,863,480 B1 | * | 3/2005 | Taylor ............... 409/182 |

OTHER PUBLICATIONS

Web pages from www.woodpecker.com entitled "PlungeLift" (5 pages (Original publication date unknown).
Web pages from www.routertechnologies.com entitled "RouterRaizer" (5 pages) (original publication date unknown).
Web pages from www.jessem.com entitled "MastRLift" (2 pages) (Original publication date unknown).

* cited by examiner

*Primary Examiner*—Boyer D. Ashley
*Assistant Examiner*—Dana Ross

(57) ABSTRACT

The present invention provides an apparatus for adjusting a depth of a table mounted plunge router. The apparatus includes a longitudinal base, a first endplate arranged on a first end of the base and a second endplate arranged on a second end of the base. A longitudinal groove is disposed in the base between the first and second endplate. A slide is provided which is disposed in the groove for movement in the groove. An adjustment mechanism is provided which enables movement of the slide in the groove. A cable in a cable housing connects the slide to the router. The adjustment mechanism enables adjustment of a depth of a plunge router bit. The present invention can be retrofitted to a wide variety of existing plunge routers, or provided as a feature of newly manufactured plunge routers.

20 Claims, 16 Drawing Sheets

METHODS AND APPARATUS FOR ADJUSTING A PLUNGE ROUTER

BACKGROUND OF THE INVENTION

The present invention relates to plunge routers, and in particular, to methods and apparatus for adjusting the bit of the router relative to the base plate of the router when mounted underneath a table. The adjustment apparatus can be retrofitted to a wide variety of existing plunge routers, or is provided as a feature of newly manufactured plunge routers.

With a typical plunge router a base plate is used to support the router against a surface of the material to be routed. A router bit is typically centered the in base and rotated by a motor. Handles are provided to grip the router if it is used in a hand-held mode. Plunge routers employ support members or columns in between the base and the main router housing. The support columns are longitudinally slideable in receiving chambers. Springs push against the interior ends of the support columns to urge them outwardly, biasing the base away from the housing of the router. This allows the base to be positioned in a rest position such that the bit does not extend past the plane of base. The base of the plunge router can therefore be placed on a surface to be routed without damaging the surface. Once in position, force can be applied to the router housing (against the springs) to move the bit down to the work surface to begin routing, for example in the middle of a work surface. Without such an arrangement, it would be very difficult to position a router to a particular starting point on a surface to be routed.

Typically, plunge routers allow some adjustment of the position of the base relative to the bit. Normal bit adjustment is provided by a knob at the end of a threaded rod, which extends along the motor housing of the plunge router. The knob can be turned to move the base farther away or closer to the bit as desired.

It is sometimes desirable to invert a plunge router and install it upside down in a table or other support so that it may be used as a table router. Therefore, most plunge routers have the flexibility of being used in a portable, hand-held manner or in a table-mounted configuration. While the normal adjustment mechanism provided on typical plunge routers is fairly satisfactory when the plunge router is used in the hand-held mode, it is difficult to use when the plunge router is fixed underneath a table. The operator typically has to reach underneath the table blindly or bend down in order locate the knob to adjust the router.

Therefore, it would be desirable to provide a mechanism for adjusting the router when mounted underneath a router table, which can be easily disconnected or disassembled from the original unit to enable use in a hand-held operation.

It would therefore be advantageous to provide methods and apparatus for simple adjustment of a table mounted plunge router. It would be advantageous to provide such an adjustment mechanism that does not require extensive modifications to the original unit and which would not limit its original functionality. It would be further advantageous to provide an adjustment mechanism which can be easily disassembled or disconnected from the router to enable hand-held operation of the router. It would be further advantageous to enable easily readable router adjustments in a comfortable manner with minimal effort. It would be advantageous to provide an adjustment mechanism which is essentially universal in nature and that can be retrofitted or installed as original equipment on a variety of types of plunge routers.

The methods and apparatus of the present invention provide the foregoing and other advantages.

SUMMARY OF THE INVENTION

The present invention relates to methods and apparatus for a bit of a plunge router relative to the base plate of the router when mounted to a table.

In an example embodiment of the invention, an apparatus for adjusting a depth of a table mounted plunge router is provided. The apparatus includes a longitudinal base, a first endplate arranged on a first end of the base and a second endplate arranged on a second end of the base. A longitudinal groove is disposed in the base between the first and second endplate. A slide is provided which is disposed in the groove for movement in the groove. An adjustment mechanism is provided which enables movement of the slide in the groove. A cable in a cable housing connects the slide to the router. The adjustment mechanism enables adjustment of a depth of a plunge router bit.

A first end of the cable may pass through the second endplate and be secured to the slide. A first end of the cable housing may be secured to the second endplate. A second end of the cable may be secured to a base of the router. A second end of the cable housing may be secured to the router. For example, the second end of the cable housing may be secured to a motor unit of the router. A bracket secured to the motor unit may be provided for securing the second end of the cable housing.

In an alternate example embodiment of the invention, a coupling may be provided on the second end of the cable which is adapted to be secured to a depth stop turret on the router base. A depth stop mechanism of the router may be removed from a mounting bracket on a motor unit of the router. The cable and cable housing may then be inserted into the mounting bracket in place of the depth stop mechanism. The second end of the cable housing may be secured in the mounting bracket. A depth stop screw may be removed from the depth stop turret and replaced with a threaded stud. The coupling may comprise a threaded coupling which is adapted to be secured to the threaded stud.

A position indicator for indicating depth of the router bit may be provided. The position indicator may comprise a digital readout.

In a further example embodiment a digital caliper may be used for indicating the depth of the router bit. A first clamp may be secured to the first endplate. A second clamp may be secured to the slide. The digital caliper, adapted to indicate router depth, may be provided which has a first caliper jaw secured in the first clamp and a second caliper jaw secured in the second clamp.

The adjustment mechanism may comprise a threaded spindle having a first end and a second end. The threaded spindle may pass through the first endplate and through the slide. The second end of the threaded spindle may be supported in the second endplate. An adjusting means may be secured to the first end of the threaded spindle.

The adjusting means may comprise a handwheel secured to the first end of the threaded spindle. A graduated dial having a pointer associated with the threaded spindle may be provided for indicating depth of the router bit.

In an alternate example embodiment of the invention, the adjusting means may comprise an electric motor coupled to the threaded spindle. A control mechanism may be coupled to the electric motor for controlling the depth of the router bit. A digital readout may be provided for indicating the depth of the router bit.

The longitudinal base may be mounted to the table in a manner such that the adjusting means is visible to an operator from above the table. Those skilled in the art will appreciate that the longitudinal base may be mounted in any convenient location which is visible to the operator. In particular, the base may be mounted at a location remote from the table, for example on a post or wall adjacent the table. Different cable lengths may be provided to enable the base to be positioned at different locations and distances from the table and the router mounted thereon.

The present invention also provides methods for adjusting the depth of a plunge router corresponding to the apparatus described above.

BRIEF DESCRIPTION OF THE DRAWINGS

The present invention will hereinafter be described in conjunction with the appended drawing figures, wherein like numerals denote like elements, and.

DETAILED DESCRIPTION

The ensuing detailed description provides exemplary embodiments only, and is not intended to limit the scope, applicability, or configuration of the invention. Rather, the ensuing detailed description of the exemplary embodiments will provide those skilled in the art with an enabling description for implementing an example embodiment of the invention. It should be understood that various changes may be made in the function and arrangement of elements without departing from the spirit and scope of the invention as set forth in the appended claims.

The present invention provides methods and apparatus for adjusting the bit of the router relative to the base plate of the router when mounted underneath a router table. The adjustment apparatus can be retrofitted to a wide variety of existing plunge routers, or provided as a feature of newly manufactured plunge routers.

Figure 1:
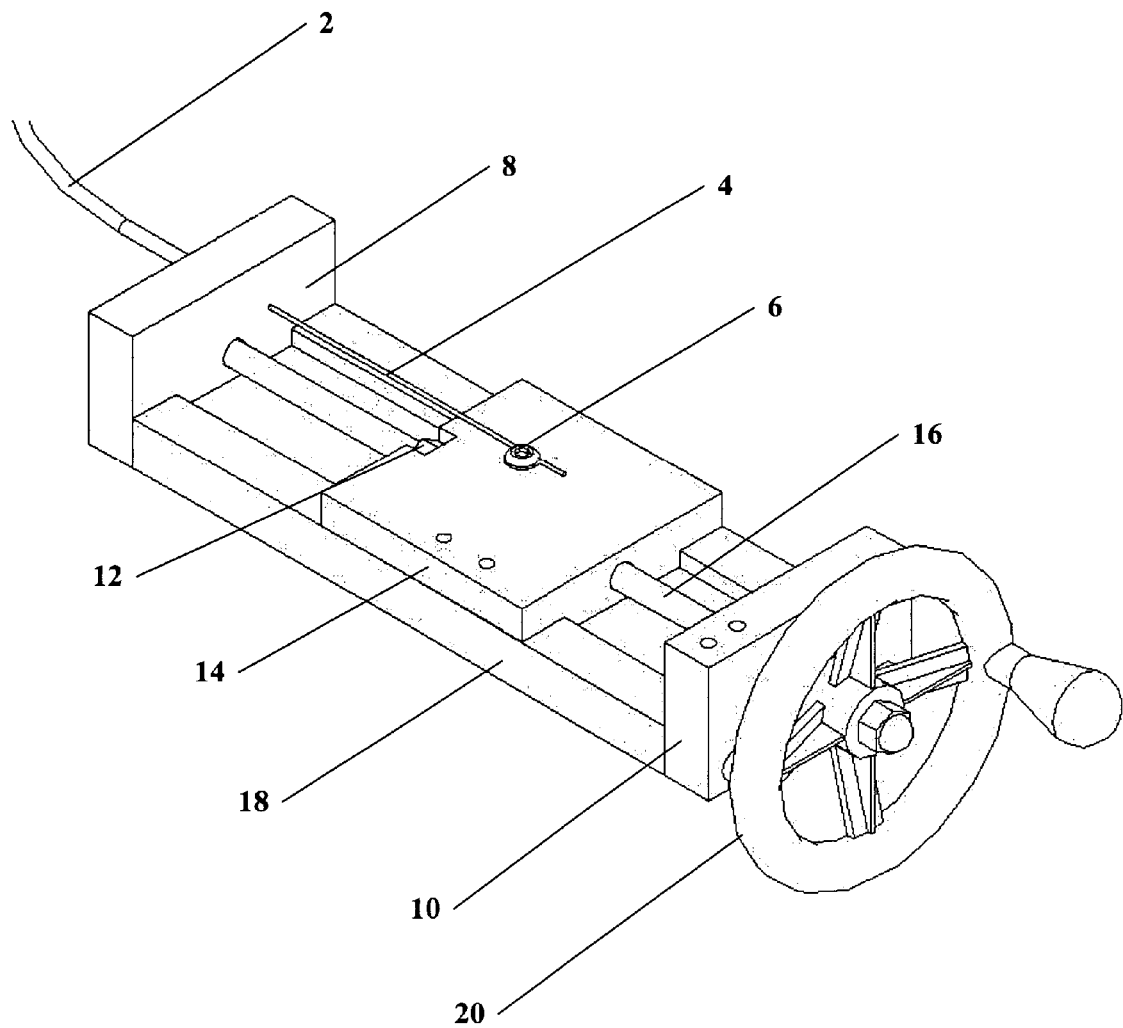
FIG. 1 shows a perspective view of an example embodiment of the invention.
Figure 2:
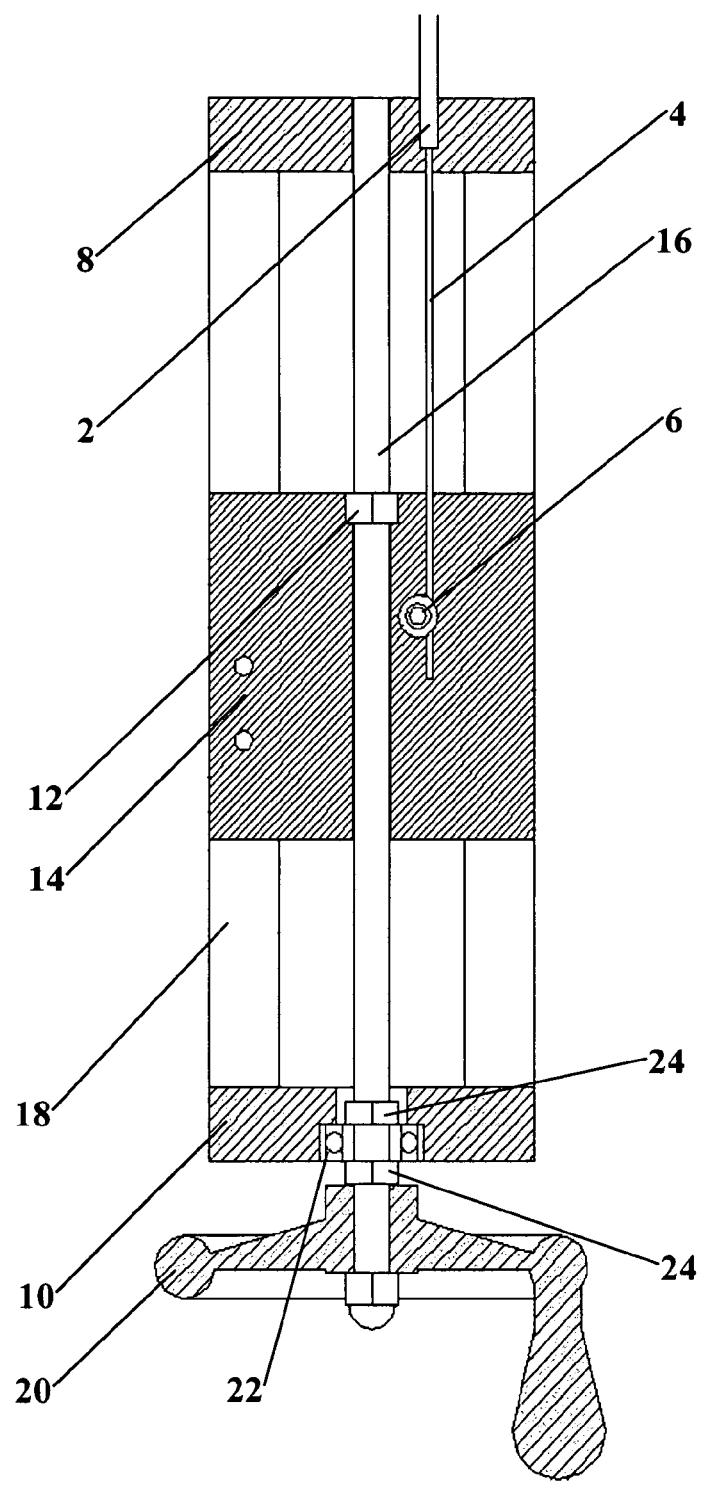
FIG. 2 shows a cross section of the embodiment of the invention shown in FIG. 1.

An example embodiment of the present invention is shown in FIGS. 1 and 2. The adjustment apparatus comprises a slide 14 that moves longitudinally in a groove in a base 18. A front endplate 10 and a rear endplate 8 are secured perpendicular to the base 18. The front portion of a threaded spindle 16 is supported by a ball bearing 22 which rests in a counterbore in the front endplate 10. The front end of the threaded spindle 16 passes through the ball bearing 22 and may be fixed to an adjustment mechanism, such as a handwheel 20 by means of a set screw. The threaded spindle 16 is kept from sliding longitudinally through the bore of the ball bearing 22 by hex lock nuts 24 tightened against opposite sides of the ball bearing. Both of these hex lock nuts 24 can be seen more clearly in FIG. 2. The threaded spindle 16 passes through a hole in the slide 14 and is threaded through a hexagonal spindle nut 12. The spindle nut 12 is retained in a groove the width of two opposing flat sides of the spindle nut 12. This groove prevents the spindle nut 12 from turning relative to the slide 14. The rear end of the threaded spindle 16 is supported, but free to turn in a hole in the rear endplate 8. The rear endplate 8 also has a counterbore in which one end of a Bowden cable housing 2 is retained. A Bowden cable 4 housed in the Bowden cable housing 2 passes through the counterbore in the rear endplate 8 and is clamped securely to the slide 14 with an anchor bolt 6.

FIG. 2 shows a cross section of the example embodiment shown in FIG. 1. This figure shows the counterbores for the ball bearing 22 and the Bowden cable housing 2 more clearly. It also shows the groove in the slide for the spindle nut 12 more clearly. The two lock nuts 24 retaining the threaded spindle 16 longitudinally can also be seen more clearly.

Figure 3:
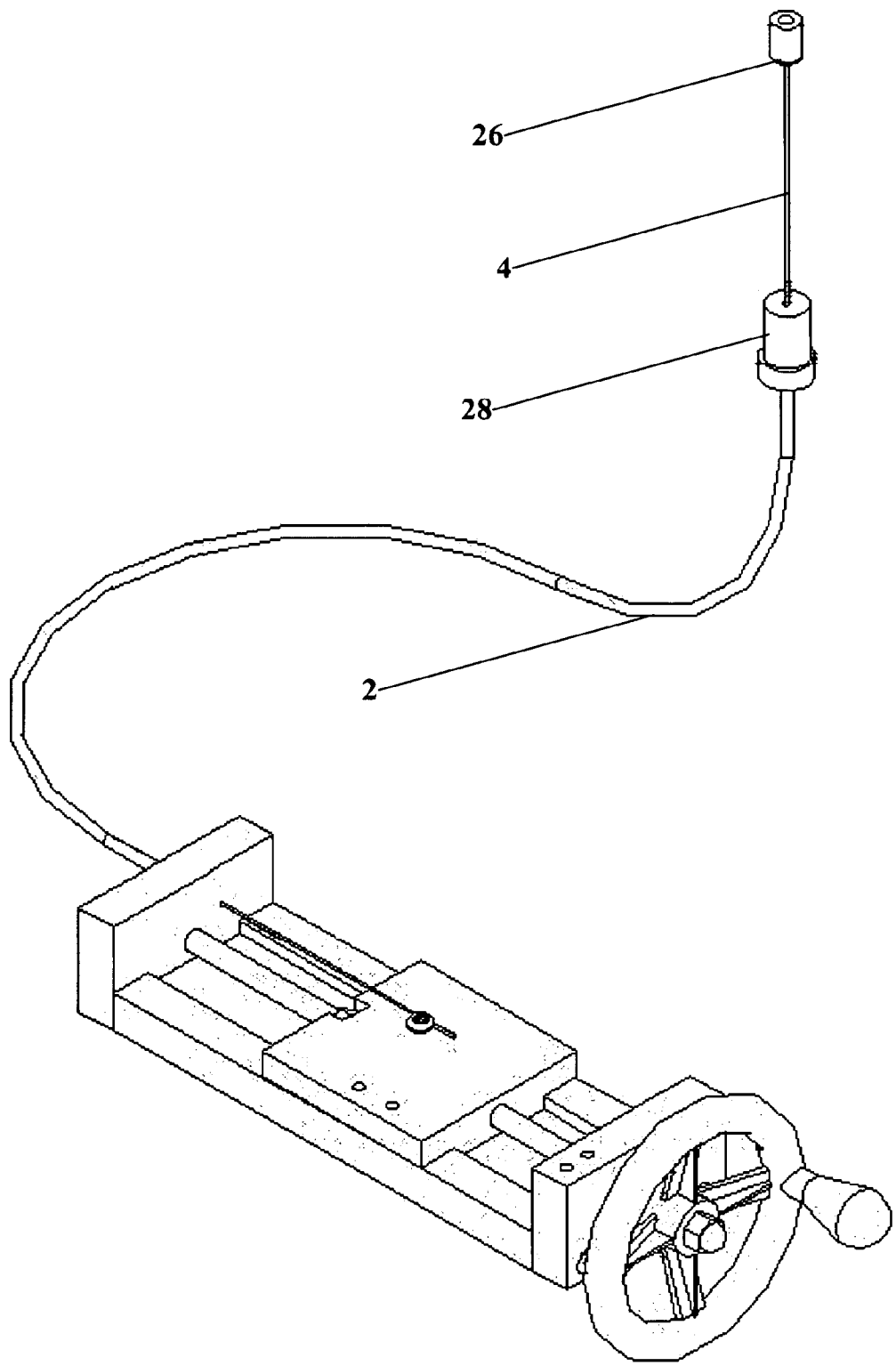
FIG. 3 shows a perspective view of an example embodiment of the invention with a Bowden cable for attachment to the router.

In FIG. 3, the full length of the Bowden cable 4 is shown, together with the Bowden cable housing 2. In the example embodiment shown in FIG. 3, a threaded coupling 26 and a bushing 28 are provided at the opposite end of the Bowden cable for connection to the router, as will be described in detail below.

Figure 4:
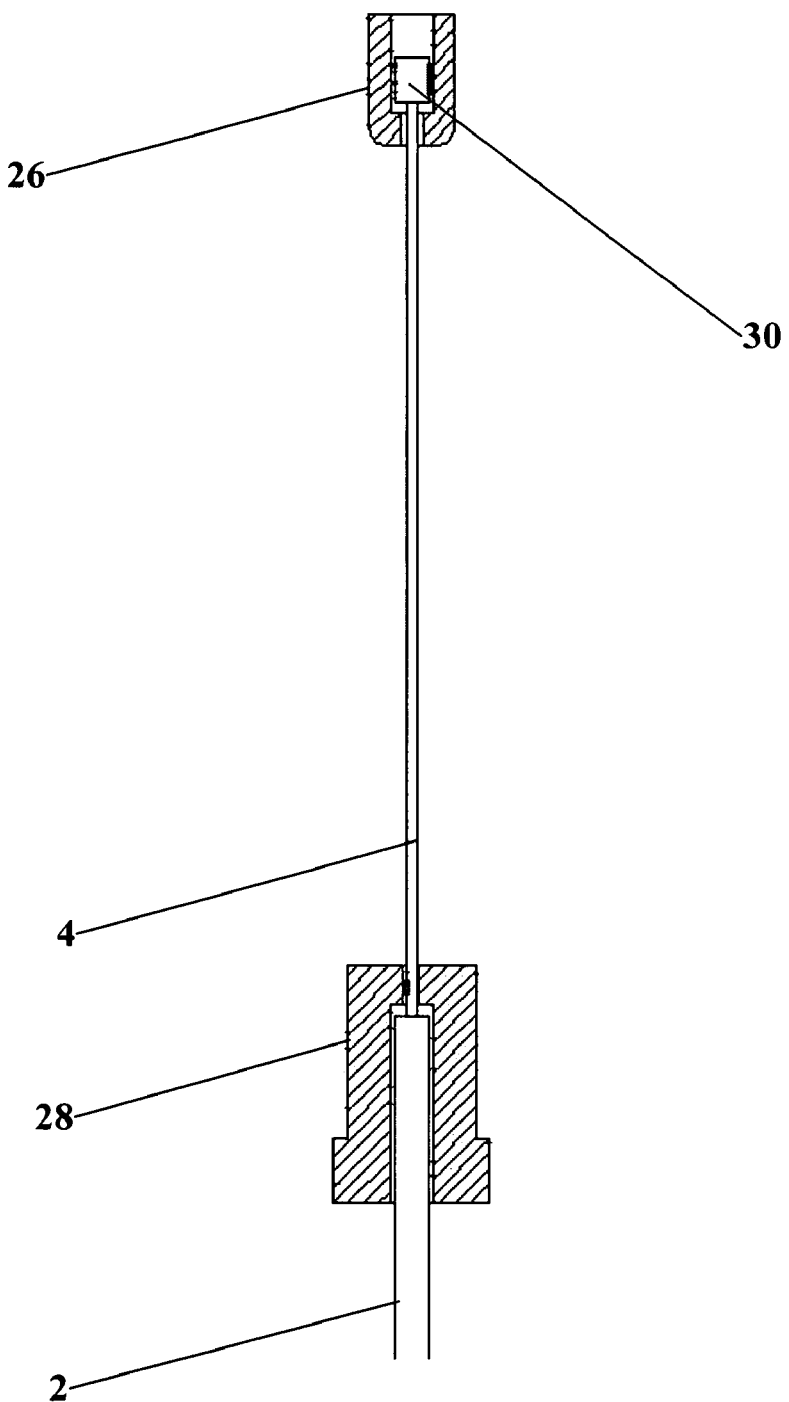
FIG. 4 shows a cross-section of a threaded coupling and bushing on a Bowden cable, together with the routing of the Bowden cable and Bowden cable housing in an example embodiment of the invention.

FIG. 4 shows a cross-section of the threaded coupling 26 and the bushing 28 with the routing of the Bowden cable 4 and Bowden cable housing 2. A hole in the open end of the coupling 26 is threaded with typical machine threads. The Bowden cable 4 may be retained in the threaded coupling 26 by an end stop 30 which is die cast onto the end of the Bowden cable 4. This allows the threaded coupling 26 to rotate freely about the Bowden cable 4 without allowing it to slip through. The Bowden cable housing 2 may be retained in a counterbore of the bushing 28. The bushing 28 also has a smaller through-hole that allows the Bowden cable 4 to slide through easily.

Figure 5:
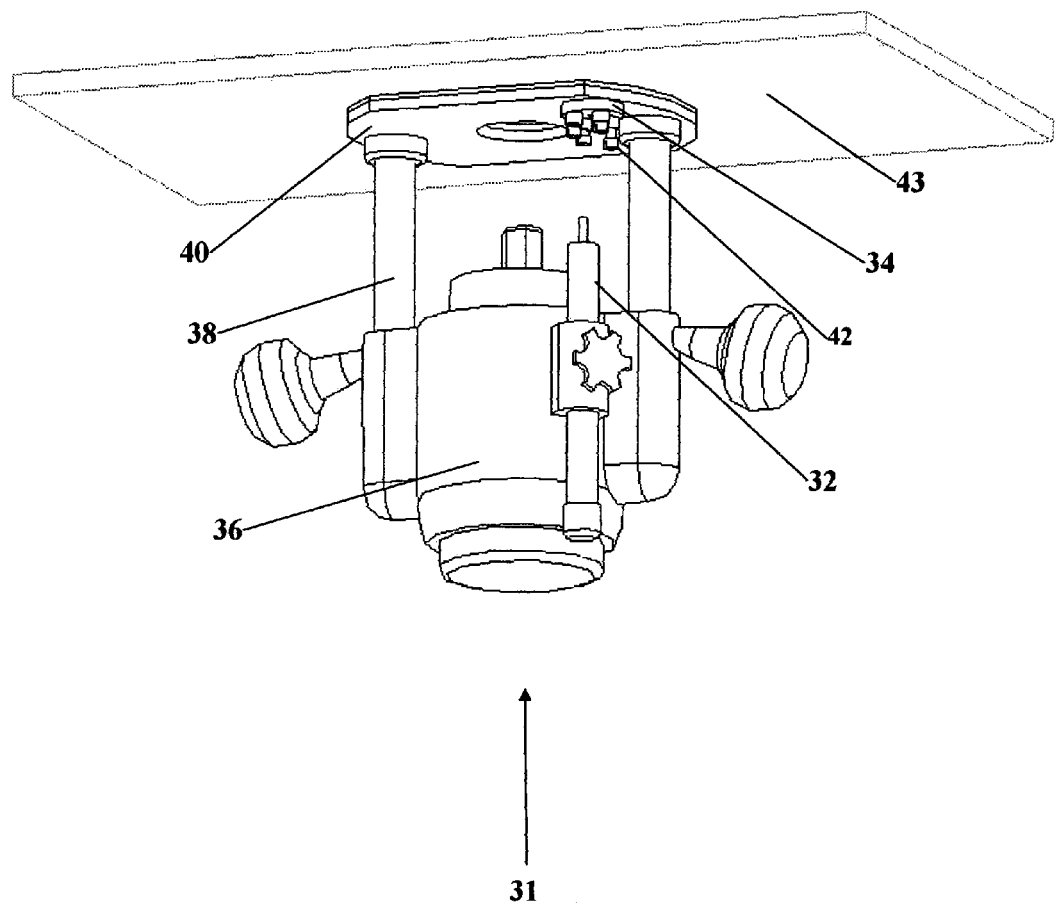
FIG. 5 shows a view of a conventional prior art plunge router with a base mounted in a typical manner to a router table.

FIG. 5 shows a view from below of a conventional prior art plunge router 31 with a base 40 mounted in a typical manner underneath a router table 43. The plunge router consists of a motor unit 36 which spins a router bit to make cuts in a material to be routed. The motor unit 36 typically travels or plunges on two guide columns 38 which are fixed to a router base 40. The length of this travel is controlled by an adjustable depth stop mechanism 32 which comes to a stop against one of a number of depth stop screws 42 each at different heights contained in a rotating depth stop turret 34. When not plunging, springs inside the guide columns force the motor unit 36 and base 40 away from each other in opposite directions. It is important to note that from this angle the adjustment mechanisms and controls are easily visible. However, they are not visible when viewed from the surface of the table 43.

Figure 6:
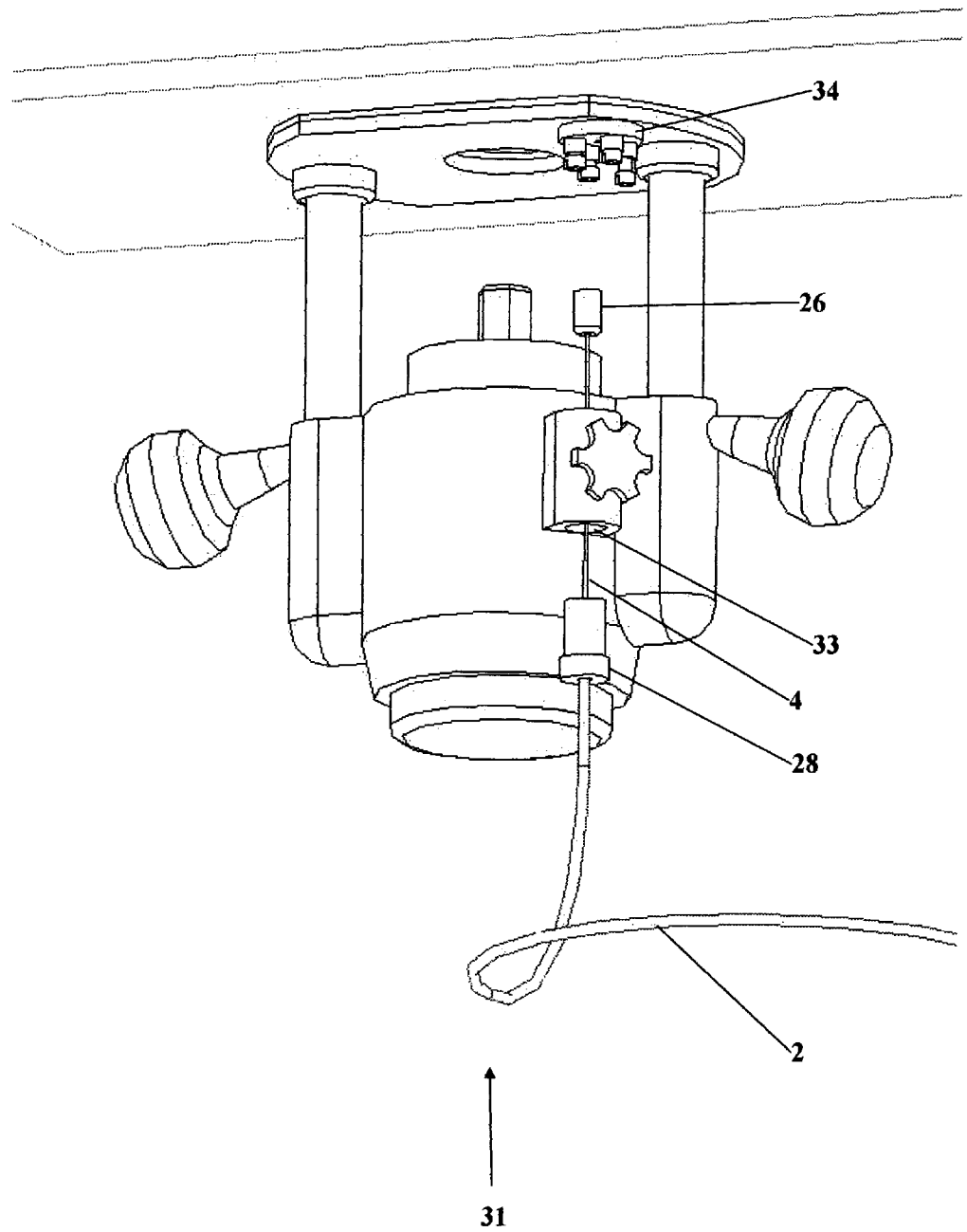
FIG. 6 illustrates an example method of installation of the present invention on a table mounted plunge router.

An example of the installation of the adjusting apparatus of the present invention on the plunge router 31 is shown in FIG. 6. With typical plunge routers the depth stop mechanism 32 is removable without tools. In FIG. 6, the depth stop mechanism 32 (shown in FIG. 5) has been removed. The Bowden cable 4, Bowden cable housing 2 and threaded coupling 26 may then be fed through the open hole 33 where the depth stop mechanism 32 is normally installed.

Figure 7:
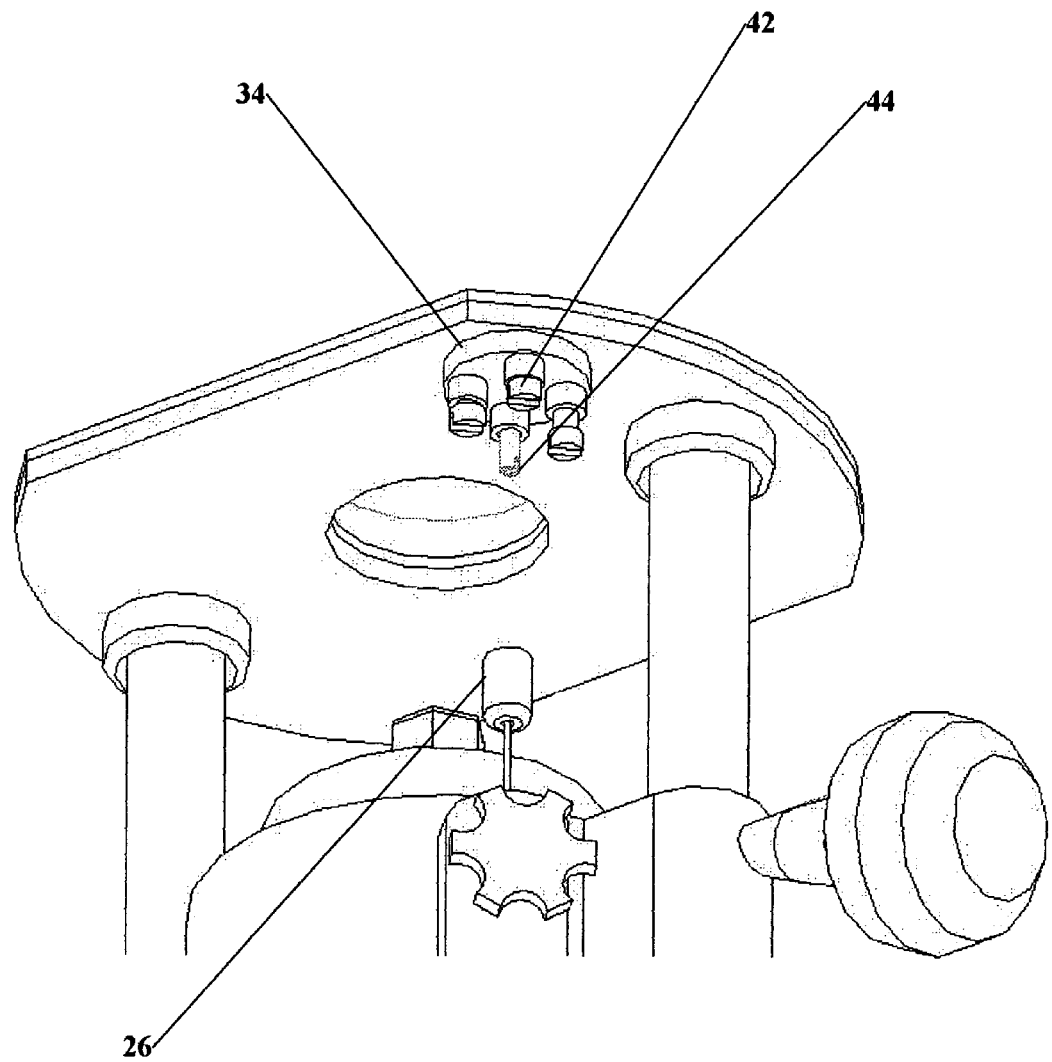
FIG. 7 shows a view of the depth stop turret of a table mounted plunge router modified in accordance with an example embodiment of the present invention.

FIG. 7 shows a closer view of the depth stop turret 34. In this example embodiment, one of the depth stop screws 42 has been removed and replaced with a threaded stud 44 which has no head. The pitch of the threads on the stud 44 matches the internal threads of the threaded coupling 26.

Figure 8:
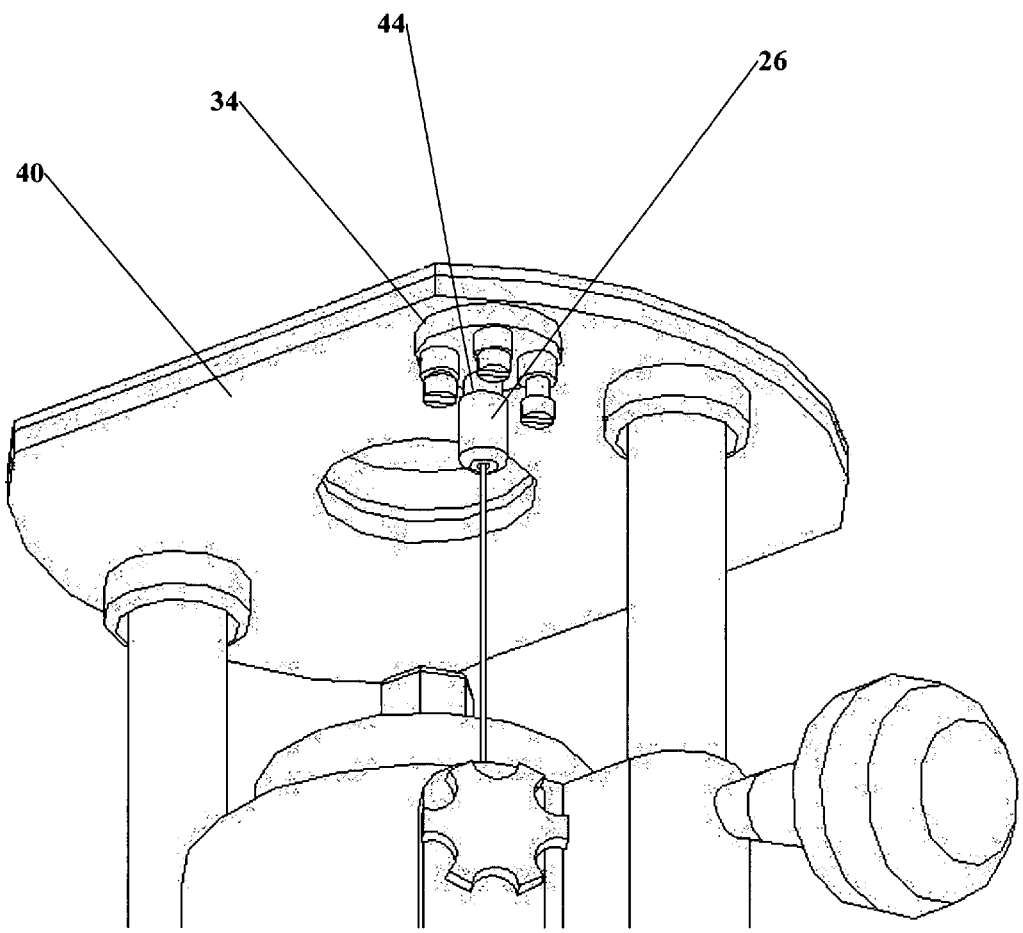
FIG. 8 shows a view of an example embodiment of the present invention where the cable is connected to the modified depth stop turret of FIG. 7.

FIG. 8 shows the threaded coupling 26 now threaded onto the stud 44 and fastened securely to the depth stop turret 34 and, consequently, to the router base 40.

Figure 9:
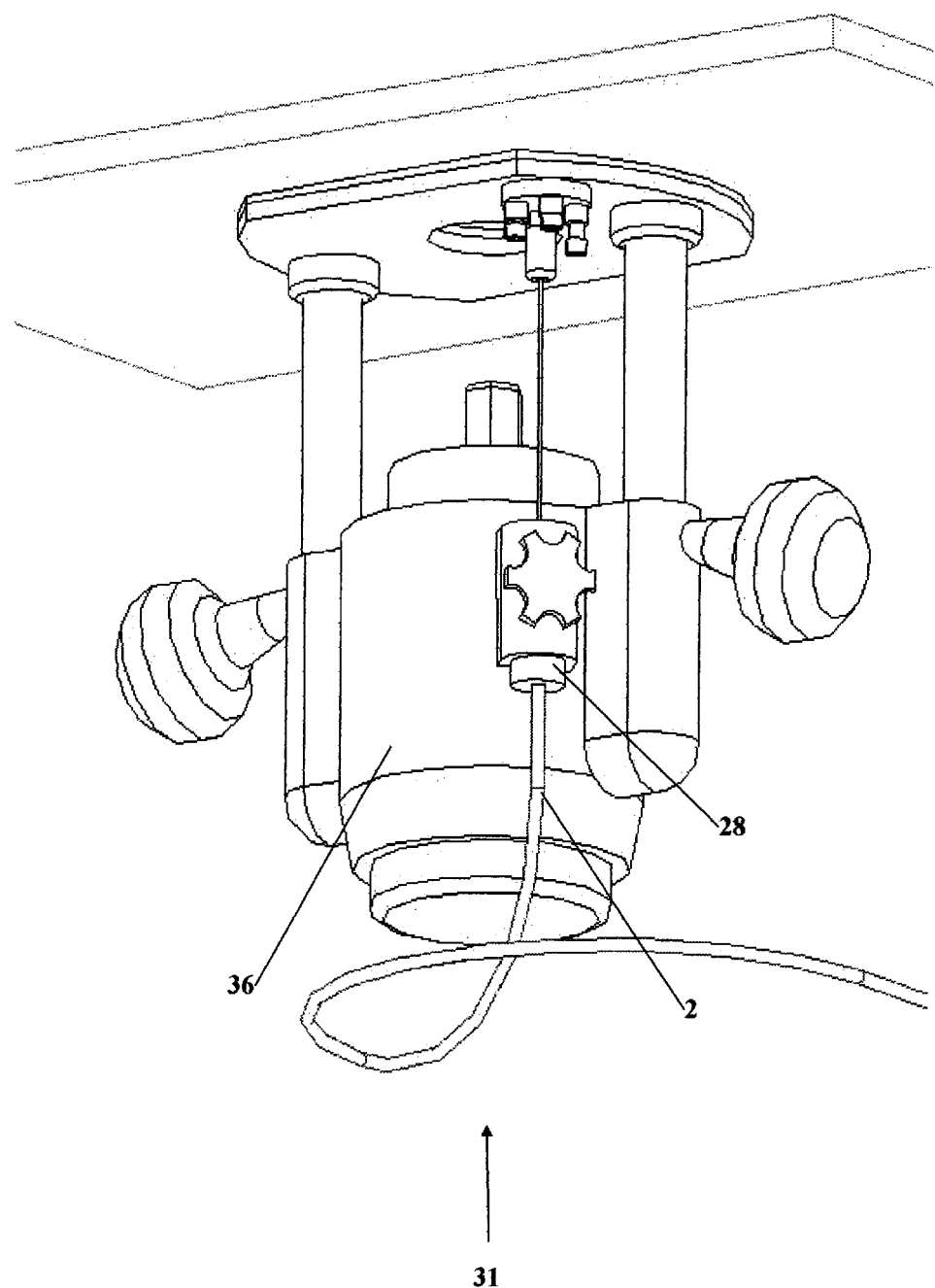
FIG. 9 shows an example embodiment of the present invention installed on a conventional table mounted plunge router.

FIG. 9 shows a perspective view of the finished installation of the device to the plunge router 31. In the example embodiment shown in FIG. 9, the bushing 28 securing the Bowden cable housing 2 is now seated in the hole 33 where the depth stop mechanism normally passes through. The head on the bushing 28, which is larger in diameter than the hole in the motor unit 36, keeps it from slipping through the hole. FIG. 9 also shows the system at rest before actuation.

Figure 10:
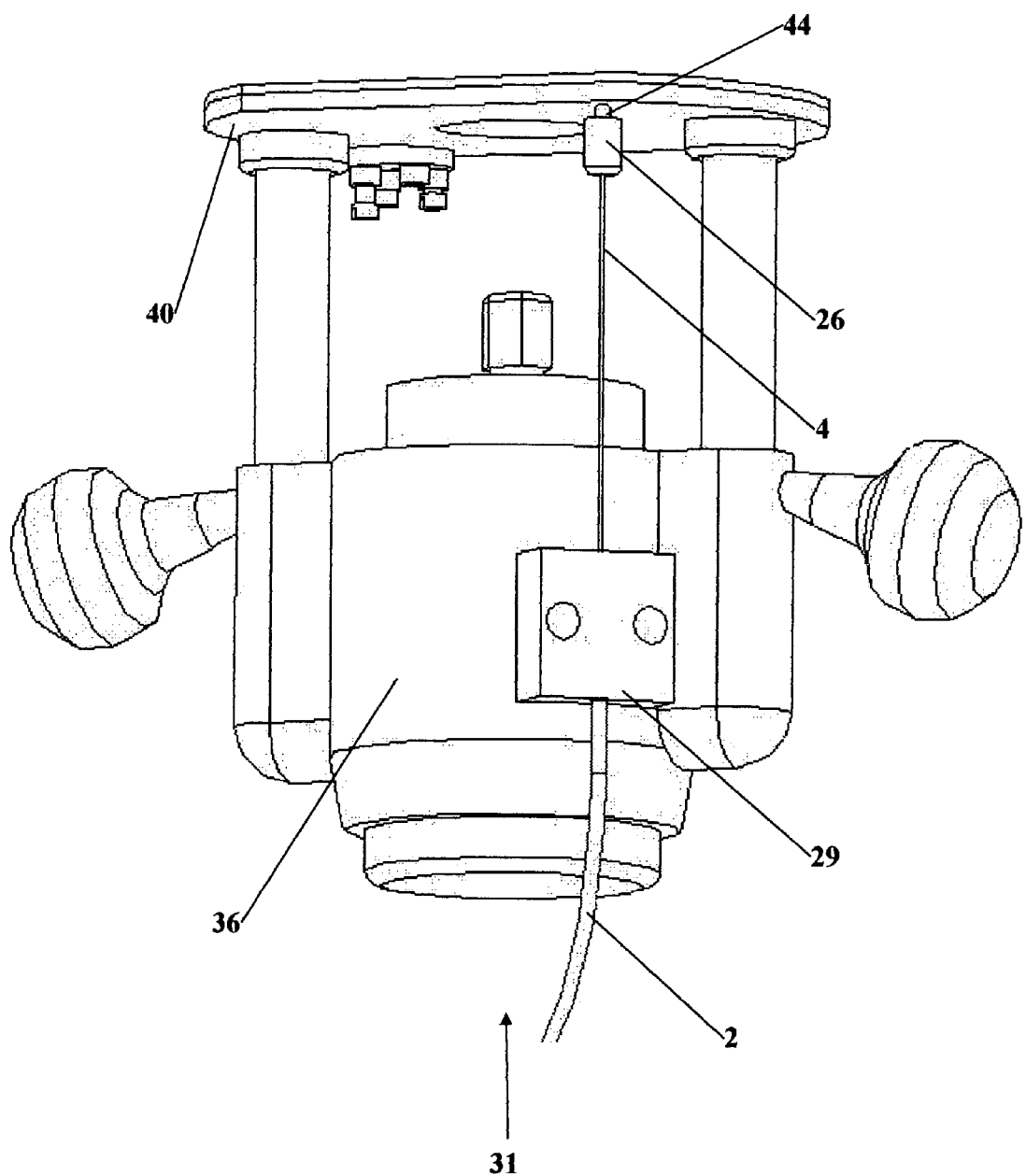
FIG. 10 shows an alternate example embodiment of installing the present invention on a table mounted plunge router.

An alternate example embodiment of the present invention is shown in FIG. 10. In particular, FIG. 10 shows an alternate method of fixing the Bowden cable 4 and housing 2 to the router. In this example embodiment, a mounting bracket 29 may be fixed directly to the motor unit 36 either with epoxy type glue or with screws. The threaded stud 44 may then be screwed into a hole drilled and tapped in the router base 40. The Bowden cable 4 and housing 2 are then seated and fixed as previously described.

Figure 11:
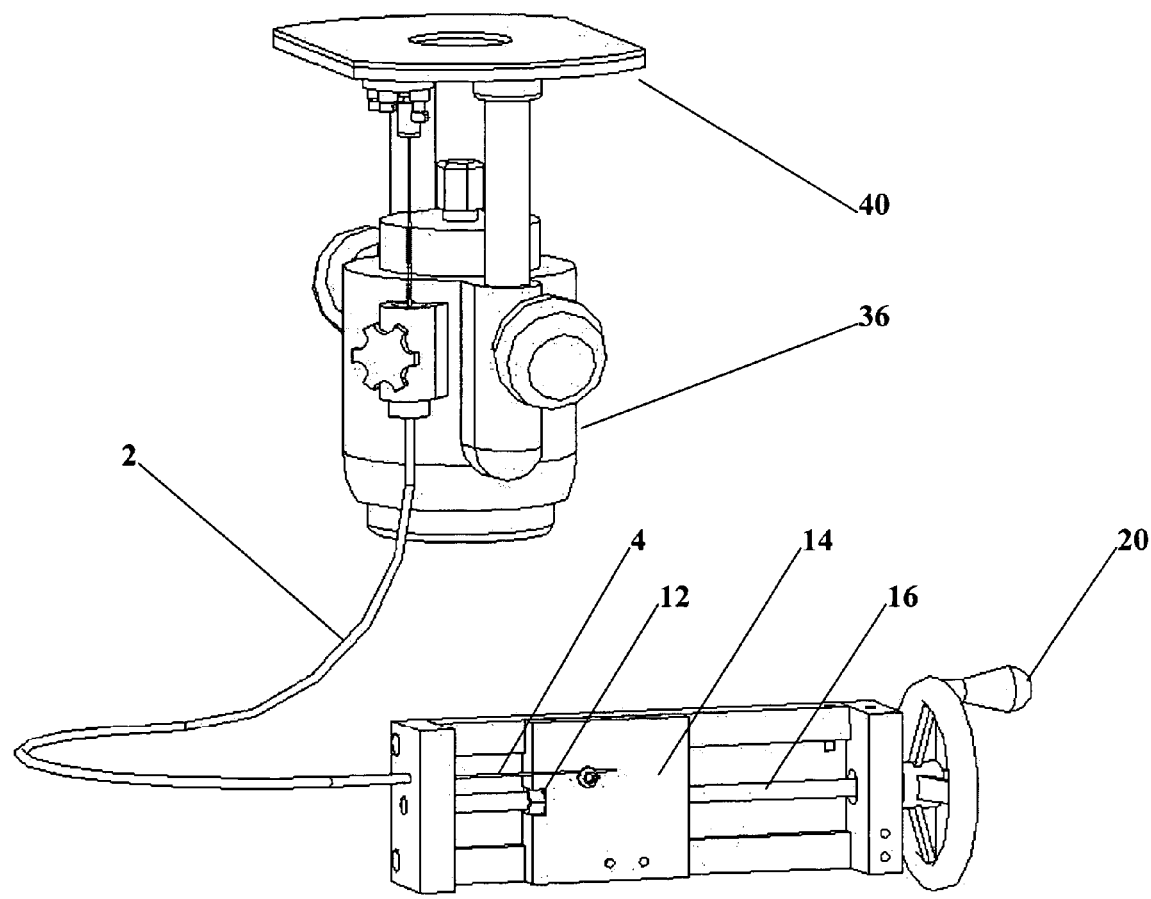
FIG. 11 shows an example embodiment of the present invention connected to a plunge router before activation of the adjustment mechanism.
Figure 12:
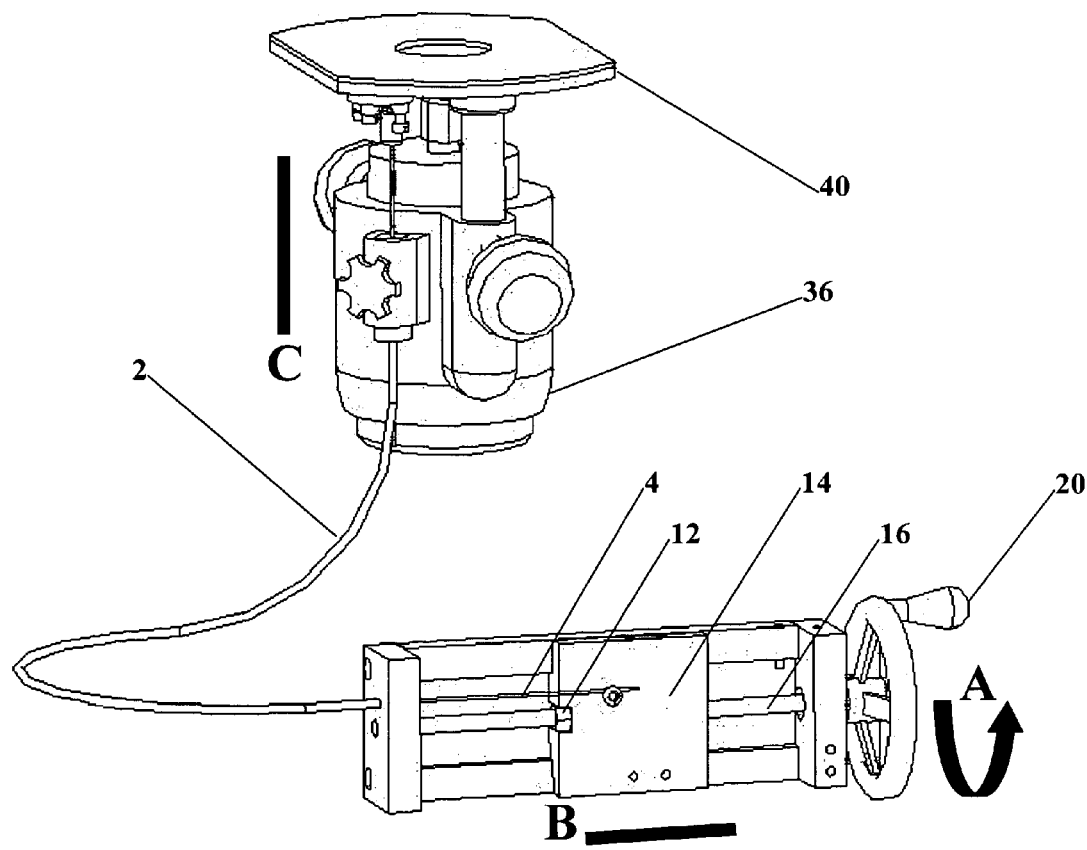
FIG. 12 shows the example embodiment of the present invention shown in FIG. 11 after activation of the adjustment mechanism.

FIGS. 11 and 12 show an example embodiment of the entire system before and after actuation, respectively. The system is shown in FIGS. 11 and 12 without the router table surface for clarity. FIG. 11 shows the system at rest. FIG. 12 shows the entire system after actuation. By turning the handwheel 20 (Rotation A), the spindle nut 12 moves the slide 14 (Linear Movement B), pulling the Bowden cable 4 along with it. The resulting movement of the Bowden cable 4 in the housing 2 pulls the router motor unit 36 closer to the router base 40 (Linear Movement C), thus making the adjustment. The mechanical advantage of threaded spindle 16 and the spindle nut 12 rotating on a ball bearing makes adjustments not only very efficient, but also very precise due to the fact that only one turn of the handwheel 20 will yield fractional linear adjustment. For example, if a thread pitch of 16 threads per inch were used for the threaded spindle, one turn of the handwheel 20 would yield 1/16" of linear travel. Simply counting the number of turns could yield sufficient accuracy for precise adjustment.

Figure 13:
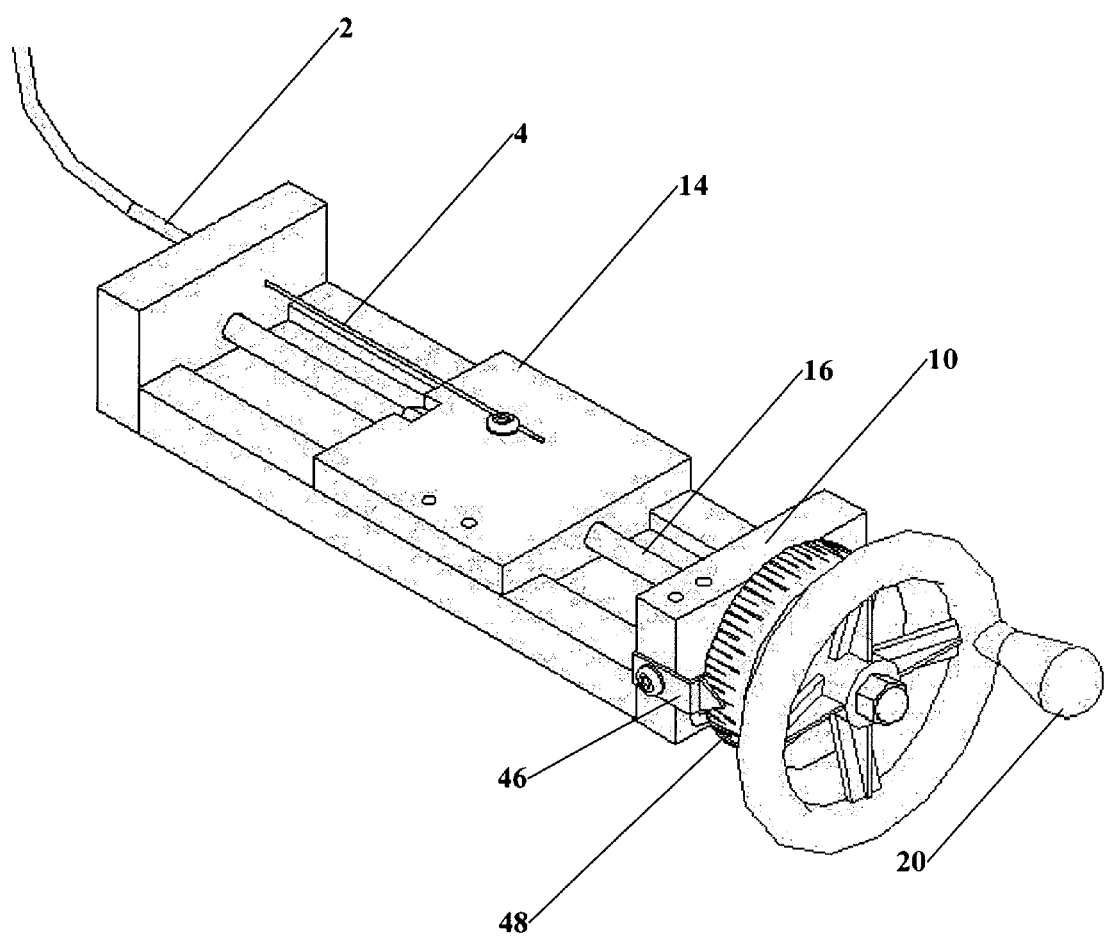
FIG. 13 shows an example embodiment a position indicator in accordance with the present invention.

As stated previously, one of the objectives of the present invention is to make adjustments of the router easily readable. To accomplish this, a readable scale or readout is needed. FIG. 13 shows the most simple and economical example embodiment of a readout for use in connection with the present invention. In this example embodiment, a graduated dial 48 is mounted directly on the threaded spindle 16. The dial 48 may be graduated in increments corresponding to the linear travel of the motor unit 36 per rotation of the handwheel 20. The dial 48 may read against a pointer 46 that is fixed to the front endplate 10.

Figure 14:
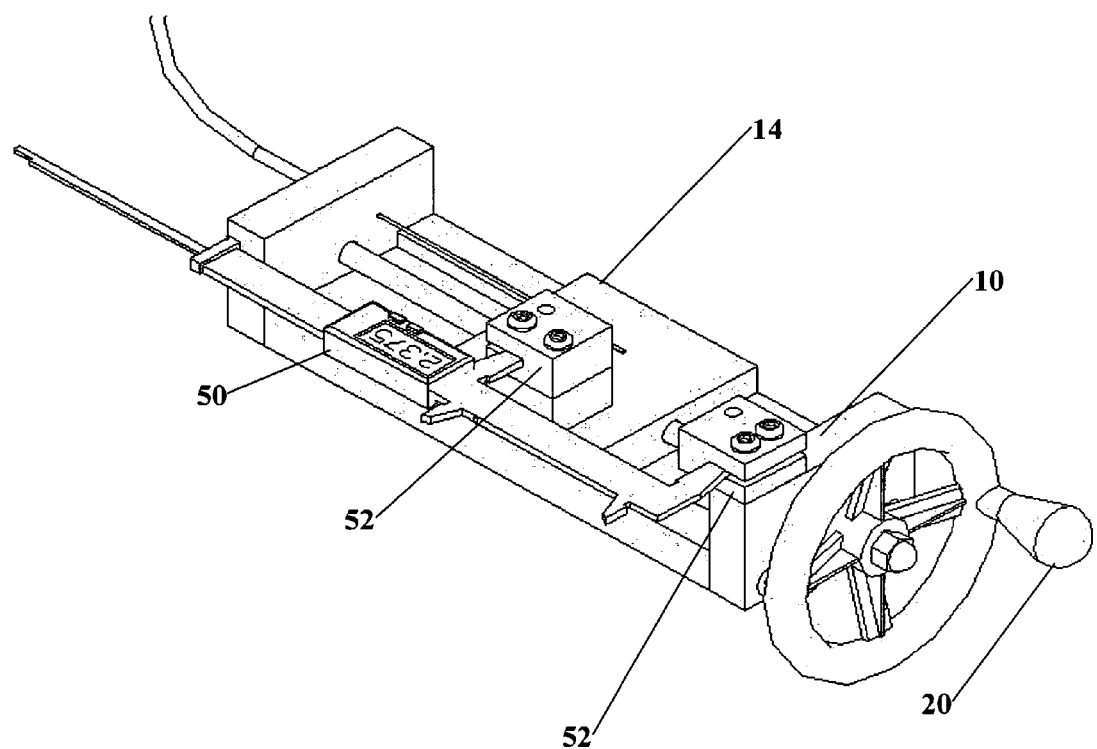
FIG. 14 shows an alternate example embodiment of a position indicator in accordance with the present invention.

FIG. 14 shows a further example embodiment which provides a more precise readout for use with the present invention. Given that the linear movement of the plunge router 31 corresponds directly to the linear movement of the slide 14, measurement of the slide movement is also a possibility. With this alternative embodiment, mounting clamps 52 are fixed first to the front endplate 10 and secondly to the slide 14. These clamps allow a digital caliper 50 to be mounted to the device. This gives the advantage of being able to read the linear movement directly from the digital display in inches or millimeters, typically in increments of 0.001" or 0.01 mm. This also allows the readout to be reset to zero anywhere along the path of travel. This can be extremely useful when setting a precise depth of cut relative to the surface of the router table. For instance, the router would first be adjusted so that the cutter would be flush with the surface of the router table, then the digital caliper 50 would be reset to zero. Then the device would simply be adjusted until the exact depth of cut shows on the digital display. This is also an economic alternative for an individual who may already own a digital caliper.

Figure 15:
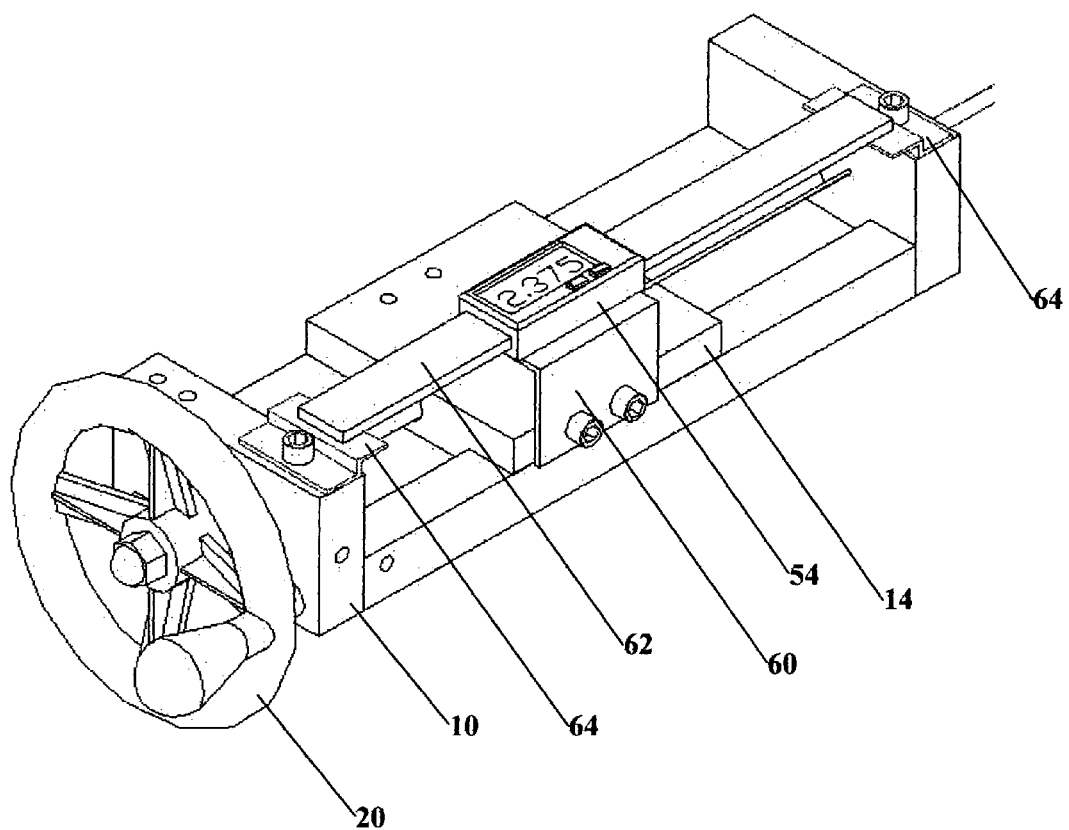
FIG. 15 shows an further example embodiment of a position indicator in accordance with the present invention.

FIG. 15 shows a third example embodiment of a readout mechanism. This embodiment provides a dedicated digital readout 54 which sits on a rail 62. The digital readout may be affixed to the slide 14 with a mounting bracket 60. The digital readout rail 62 may be affixed to the front endplate 10 and the rear endplate 8 using mounting brackets 64. A digital readout of this type is readily available and commonly used as a digital readout for drill press or milling machine spindle travel. It has the same electronic features as the digital caliper 50 described in FIG. 12 in that it can be switched from inches to millimeters, and can be reset to zero as needed.

Figure 16:
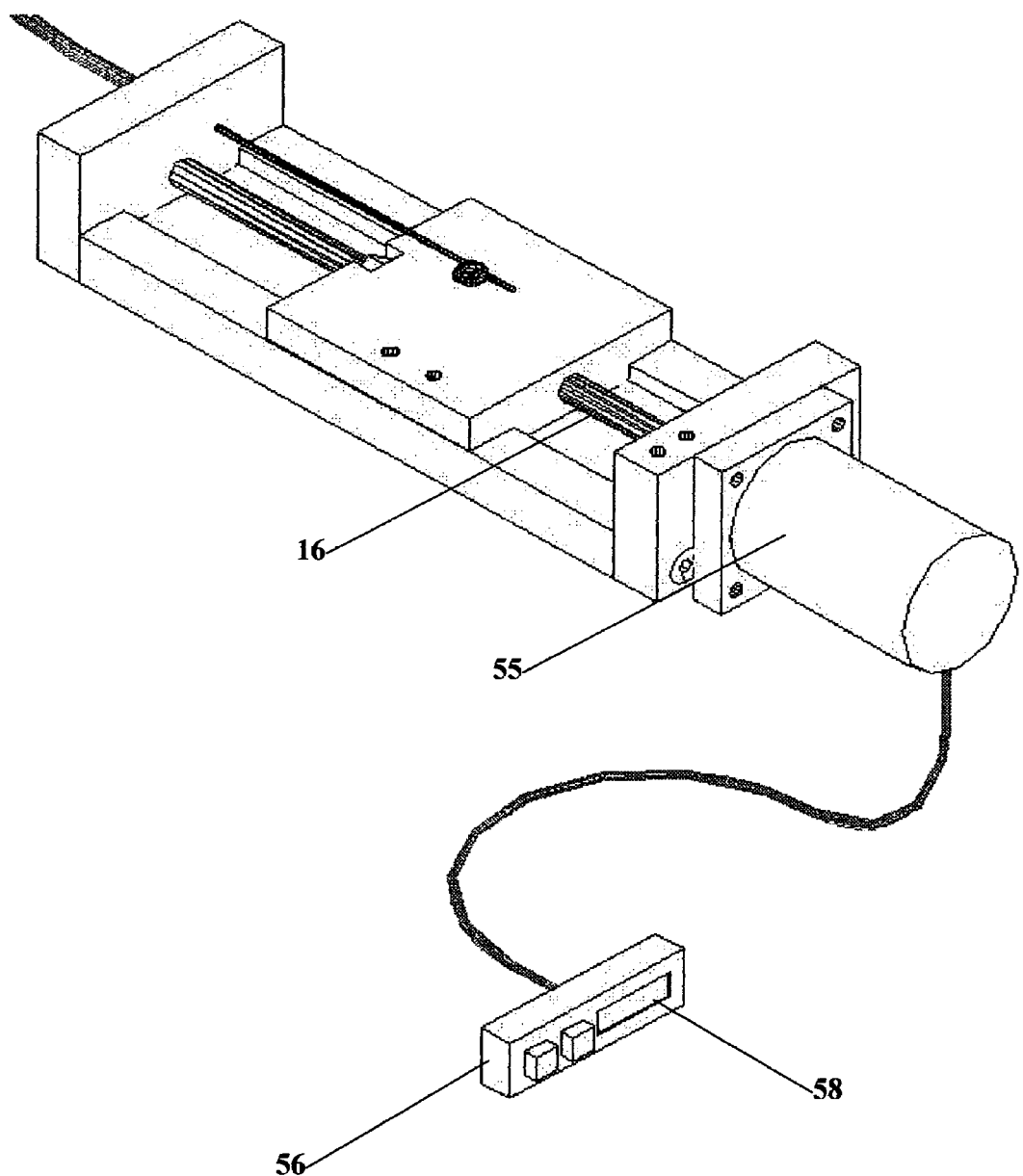
FIG. 16 shows an example embodiment of the present invention with a motorized adjustment mechanism.

FIG. 16 shows a fourth alternative embodiment where the device is remotely actuated by an actuating motor 55 which is fixed to the spindle 16. A control panel 56 with a digital readout 58 controls the motor 55 and provides position information. The control panel 56 may be mounted wherever is convenient.

It should now be appreciated that the present invention provides advantageous methods and apparatus for adjusting the bit of a router relative to the base plate of the router when mounted to a router table.

Although the invention has been described in connection with various illustrated embodiments, numerous modifications and adaptations may be made thereto without departing from the spirit and scope of the invention as set forth in the claims.

What is claimed is:

1. An apparatus for adjusting a depth of a table mounted plunge router, comprising:
    a longitudinal base;
    a first endplate arranged on a first end of said base;
    a second endplate arranged on a second end of said base;
    a longitudinal groove disposed in said base between said first and second endplates;

a slide disposed in said groove for movement in said groove;
an adjustment mechanism for enabling movement of said slide in said groove;
a cable in a cable housing for connecting said slide to said router;
wherein the adjustment mechanism enables adjustment of a depth of a plunge router bit.

2. Apparatus in accordance with claim 1, wherein:
a first end of said cable passes through said second endplate and is secured to said slide;
a first end of said cable housing is secured to said second endplate;
a second end of said cable is secured to a base of said router; and
a second end of said cable housing is secured to said router.

3. Apparatus in accordance with claim 2, wherein:
said second end of said cable housing is secured to a motor unit of said router.

4. Apparatus in accordance with claim 3, further comprising:
a bracket secured to said motor unit for securing said second end of said cable housing.

5. Apparatus in accordance with claim 2, further comprising:
a coupling on said second end of said cable adapted to be secured to a depth stop turret on said router base.

6. Apparatus in accordance with claim 5, wherein:
a depth stop mechanism of said router is removed from a mounting bracket on a motor unit of said router;
said cable and cable housing are inserted into said mounting bracket in place of said depth stop mechanism; and
said second end of said cable housing is secured in said mounting bracket.

7. Apparatus in accordance with claim 5, wherein:
a depth stop screw has been removed from said depth stop turret and replaced with a threaded stud;
said coupling comprises a threaded coupling which is adapted to be secured to said threaded stud.

8. Apparatus in accordance with claim 1, further comprising:
a position indicator for indicating depth of said router bit.

9. Apparatus in accordance with claim 8, wherein:
said position indicator comprises a digital readout.

10. Apparatus in accordance with claim 1, wherein said adjustment mechanism comprises:
a threaded spindle having a first end and a second end, said threaded spindle passing through said first endplate and through said slide, said second end of said threaded spindle being supported in said second endplate;
adjusting means secured to said first end of said threaded spindle.

11. Apparatus in accordance with claim 10, wherein:
said adjusting means comprises a handwheel secured to said first end of said threaded spindle.

12. Apparatus in accordance with claim 10, further comprising:
a graduated dial having a pointer associated with said threaded spindle for indicating depth of said router bit.

13. Apparatus in accordance with claim 10, wherein:
said adjusting means comprises an electric motor coupled to said threaded spindle;
a control mechanism coupled to said electric motor for controlling said depth of said router bit; and
a digital readout for indicating said depth.

14. Apparatus in accordance with claim 10, wherein:
said longitudinal base is mounted to said table in a manner such that said adjusting means is visible to an operator from above said table.

15. Apparatus in accordance with claim 1, further comprising:
a first clamp secured to the first endplate;
a second clamp secured to the slide;
a digital caliper adapted to indicate router depth having a first caliper jaw secured in said first clamp and a second caliper jaw secured in said second clamp.

16. A method for enabling adjustment of a depth of a table mounted plunge router, comprising:
providing a longitudinal base;
providing a first endplate arranged on a first end of said base;
providing a second endplate arranged on a second end of said base;
providing a longitudinal groove disposed in said base between said first and second endplates;
providing a slide disposed in said groove for movement in said groove;
enabling movement of said slide in said groove via an adjustment mechanism;
connecting said slide to said router via a cable in a cable housing;
wherein the adjustment mechanism enables adjustment of a depth of a plunge router bit.

17. A method in accordance with claim 16, further comprising:
passing a first end of said cable through said second endplate;
securing said first end of said cable to said slide;
securing a first end of said cable housing to said second endplate;
securing a second end of said cable to a base of said router; and
securing a second end of said cable housing to said router.

18. A method in accordance with claim 16, further comprising:
providing a position indicator for indicating depth of said router bit.

19. A method in accordance with claim 16, wherein said adjustment mechanism comprises:
a threaded spindle having a first end and a second end, said threaded spindle passing through said first endplate and through said slide, said second end of said threaded spindle being supported in said second endplate; and
adjusting means secured to the first end of said threaded spindle.

20. A method in accordance with claim 19, wherein:
said adjusting means comprises a handwheel secured to said first end of said threaded spindle.

* * * * *